(12) United States Patent  
Griffiths et al.

(10) Patent No.: US 7,733,586 B2
(45) Date of Patent: Jun. 8, 2010

(54) LENS POSITIONING ASSEMBLY

(75) Inventors: Paul Scott Griffiths, Hertfordshire (GB); William Roland Hawes, Hertfordshire (GB)

(73) Assignee: FFEI Limited, Hertfordshire (GB)

( * ) Notice: Subject to any disclaimer, the term of this patent is extended or adjusted under 35 U.S.C. 154(b) by 196 days.

(21) Appl. No.: 12/121,819

(22) Filed: May 16, 2008

(65) Prior Publication Data

US 2009/0284853 A1 Nov. 19, 2009

(51) Int. Cl.
*G02B 7/02* (2006.01)
(52) U.S. Cl. .................. 359/822; 359/823; 359/819
(58) Field of Classification Search ............. 359/811, 359/813, 814, 819, 821, 822, 823, 824
See application file for complete search history.

(56) References Cited

U.S. PATENT DOCUMENTS

| 4,511,212 | A | 4/1985 | Tanaka |
| 4,684,797 | A | 8/1987 | Ando et al. |
| 6,548,796 | B1 | 4/2003 | Silvermintz |
| 7,082,084 | B2 * | 7/2006 | Kabasawa ............ 369/44.16 |
| 2002/0018291 | A1 | 2/2002 | Fukuyama |
| 2002/0124636 | A1 | 9/2002 | Massie et al. |
| 2004/0027656 | A1 | 2/2004 | Ue |
| 2005/0036775 | A1 | 2/2005 | Morimoto |

FOREIGN PATENT DOCUMENTS

| EP | 0736788 A2 | 3/1996 |
| EP | 1882971 A | 1/2008 |
| GB | 383100 A | 11/1932 |
| GB | 1224612 A | 3/1971 |
| GB | 1476583 | 6/1977 |
| GB | 2183418 A | 6/1987 |
| GB | 2273994 A | 7/1994 |
| JP | 9-311262 A | 12/1997 |
| JP | 2003-214835 A | 7/2003 |
| WO | 2006/078893 A2 | 7/2006 |

* cited by examiner

*Primary Examiner*—Timothy J Thompson
(74) *Attorney, Agent, or Firm*—Sughrue Mion, PLLC

(57) ABSTRACT

A microscope objective lens positioning assembly comprises a lens mounting member to which a microscope objective lens defining an optical axis is mounted; a support member; and a pair of leaf springs. Each leaf spring has first and second ends, the first ends of the leaf springs being secured to upper and lower aligned locations respectively on the support member, and the second ends of the leaf springs being secured to corresponding upper and lower locations respectively on the lens mounting member whereby the two leaf springs, the optical axis of the objective lens, and a line between the upper and lower aligned locations on the support member define a parallelogram, the leaf springs flexing in use in response to movement of the lens mounting member.

21 Claims, 3 Drawing Sheets

LENS POSITIONING ASSEMBLY

FIELD OF THE INVENTION

The invention relates to a lens positioning assembly, for example for a microscope objective lens.

BACKGROUND OF THE INVENTION

In the field of microscopes used for scanning biological samples and the like, it is often necessary to refocus the objective lens rapidly in order to compensate for variations in thickness of the biological sample being inspected. This is done by moving the microscope objective lens relative to a support member so as to adjust the distance between the objective lens and the sample. It is difficult to move an objective lens rapidly because the lens and its support assembly typically weigh over 100 grams but in the past this has been achieved by mounting the objective lens support assembly to a piezoelectric element and applying a suitable control signal to the element to cause the element to move the support assembly. The problem with this known arrangement is that a piezoelectric element can only move the microscope objective lens and its support assembly by relatively small amounts, typically less than 500 microns and at relatively low accelerations while requiring purpose built actuators.

SUMMARY OF THE INVENTION

In accordance with the present invention, a lens positioning assembly comprises a lens mounting member to which a lens defining an optical axis is mounted, the lens mounting member being movably connected to a support member; an actuator on the optical axis of the lens for applying a force to the lens mounting assembly the force passing through the centre of mass of the lens; and a reflector mounted independently of the lens mounting member for reflecting radiation passing through the objective lens away from the optical axis.

With this new arrangement, we have found that it is possible to achieve much greater movement distances, for example up to 6 mm, but still at a very fast rate so that there is little reduction in imaging time. Accelerations in the order of 27 ms$^{-2}$ can be achieved.

In particular, a key benefit of the system is that it allows a heavy lens to be driven at high accelerations along its optical axis. To do this, the force from the actuator acts along the optical axis while the reflector turns the optical axis. It will be noted that the reflector does not move with the objective lens so that there is a fixed path from the reflector to a remote detector or the like.

The invention is applicable to a wide variety of lenses, but is particularly suitable for microscope objective lenses or other small imaging lenses, for example as part of a graphic arts optical scanning system.

Preferably, the assembly further comprises a flexure connecting the lens mounting assembly to the support member to enable the lens mounting assembly to move relative to the support member. Other mounting arrangements are possible such as using a linear bearing or a guided spring arrangement. In the preferred arrangement, the flexure comprises a pair of leaf springs, each leaf spring having first and second ends, the first ends of the leaf springs being secured to upper and lower aligned locations respectively on the support member, and the second ends of the leaf springs being secured to corresponding upper and lower locations respectively on the lens mounting member whereby the two leaf springs, the optical axis of the objective lens, and a line between the upper and lower aligned locations on the support member define a parallelogram, the leaf springs flexing in use in response to movement of the lens mounting member.

By arranging that the optical axis of the objective lens, the upper and lower aligned locations and the two leaf springs define a parallelogram, movement of the objective lens is maintained substantially in a line coincident with the optical axis of the lens providing relative distances moved are small compared with the length of the leaf springs.

One possible drawback in some applications of this arrangement is that a rapid movement of the objective lens can lead to resonance due to the flexibility of the leaf springs. Preferably, therefore, the assembly further comprises stiffening members secured to each leaf spring to reduce the active length of the leaf springs. Typically, the stiffening members are plates having a thickness greater than that of the leaf springs although other types of stiffening member such as rods or bars could also be used. Furthermore, the thickness of the stiffening members could be equal to or less than that of the springs.

Conveniently, the stiffening members are bonded to the leaf springs across their whole surface area. Although other joining methods could be used including riveting, welding or the like, bonding is preferred because with other methods (e.g. riveting) the springs and stiffners resonate independently.

A preferred movement actuator is a linear actuator such as a voice coil actuator or piezo device. This is particularly suited to the relatively small movements that the objective lens support assembly is required to undergo but is very accurate.

Typically, the voice coil actuator includes a magnet and an electrical coil with which the magnet interacts, the magnet being mounted on one of the support member and the lens mounting member and the coil being mounted to the other of the support member and the lens mounting member.

BRIEF DESCRIPTION OF THE DRAWINGS

An example of a microscope including an objective lens positioning assembly according to the invention will now be described with reference to the accompanying drawings, in which:—

DETAILED DESCRIPTION OF EMBODIMENT

Figure 1:
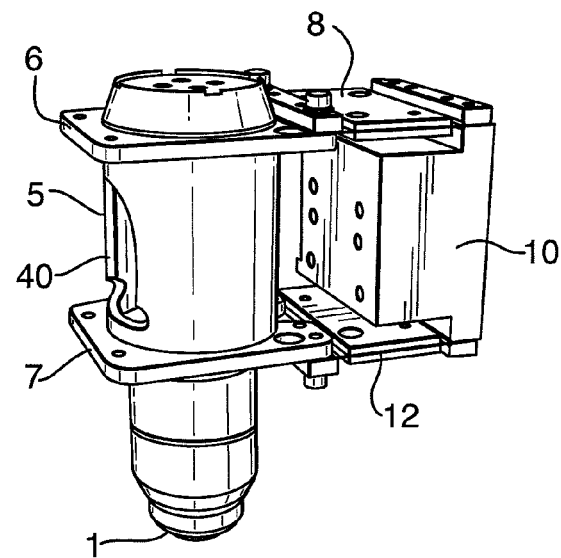
FIG. 1 is a perspective view from one side of the objective lens positioning assembly with the voice coil bracket removed.
Figure 2:
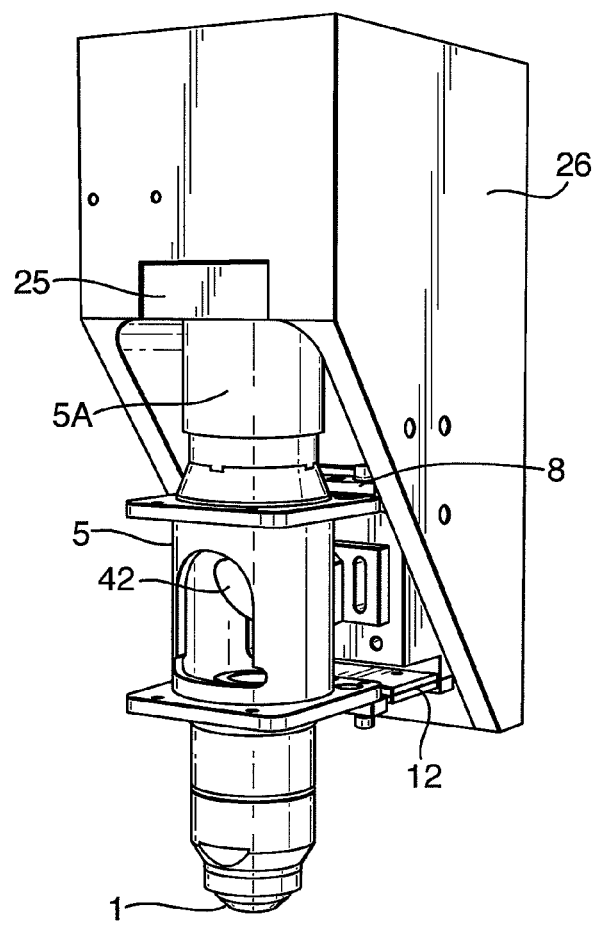
FIG. 2 is a perspective view of the objective lens positioning assembly with the voice coil bracket in place.

The objective lens positioning assembly is shown in the drawings with an objective lens 1 mounted to it. As can be seen most clearly in FIG. 4, the objective lens 1 is supported in a barrel 2 having an external screw thread 3 by means of an internally screw threaded retaining nut 4. The barrel 2 is formed at the lower end of a tube 5 having upper and lower flanges 6,7.

An upper leaf spring 8 is bolted by a bar 9 at the first end to a support member 10 and at its second end is bolted by a bar 11 to the flange 6.

A leaf spring 12 is bolted by a bar 13 at a first end to the support member 10 and is bolted by a bar 14 at a second end to the flange 7.

The distance D between the first ends of the leaf springs 8,12 is the same as the distance D between the second ends of the leaf springs 8,12. D is 66 mm in one example. Similarly, the distance between the point at which each leaf spring 8,12 is fixed at its first end, to the optical axis 15 of the objective lens 1 is the same as shown by "d". "d" is 71 mm in the one example.

The assembly described so far forming a parallelogram is referred to as a "flexure".

The upper end of the tube 5 is formed by a voice coil actuator assembly 5A including an upwardly extending tubular portion 20 on the outer circumference of which is wound a coil 21. The tubular portion 20 and coil 21 are slidably mounted in a downwardly facing, tubular portion 22 while an internal spigot 23 is inserted within the tubular portion 20 and mounts voice coil magnets 24.

The spigot 23 is fixed to a voice coil adjustment block 25 which in turn is mounted to a bracket 26.

Figure 4:
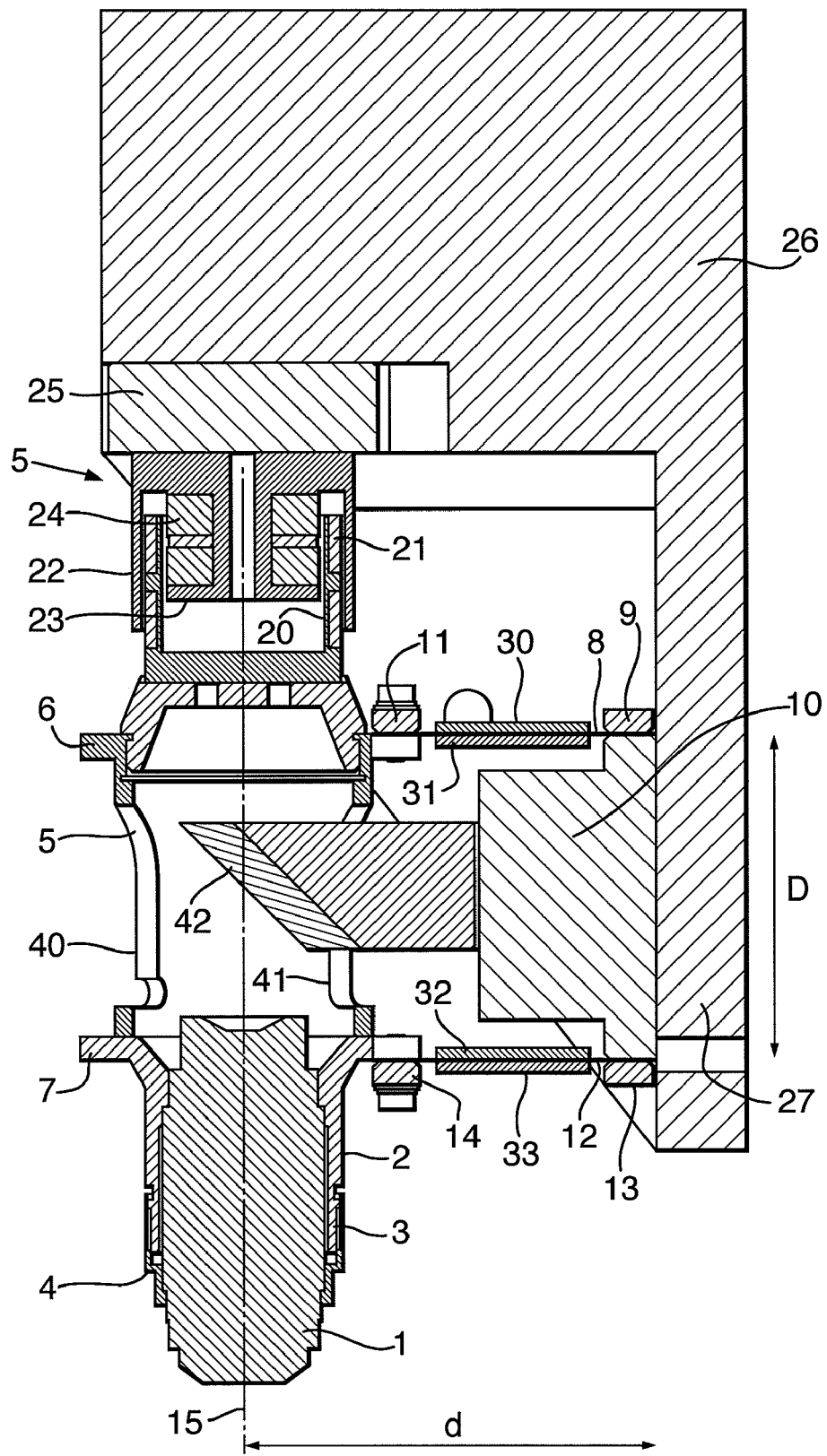

It will be seen in FIG. 4 that the support member 10 is mounted to a depending wall 27 of the bracket 26.

When the voice coil 21 is activated, it will cause movement of the tube 5 relative to the spigot 23 and this movement will be permitted by virtue of the flexure thus allowing the objective lens 1 to be moved up and down relative to the bracket 26. In the example where the distance d is 71 mm and the distance D is 66 mm, the amount of movement of the lens 1 required is up to about 6 mm. Consequently, there will be very little lateral movement of the lens 1 when it is moved up and down.

Attached to both surfaces of the flexure leaf springs 8,12 are stiffening plates 30,31; 32,33 of thicker material, which reduce the active length of the springs to a very small length. These stiffening plates are bonded to the leaf spring across their whole surface area. The leaf springs are made in cold rolled stainless steel and the stiffening plates are made in SRBF (Synthetic Resin Bonded Fabric) laminate.

The leaf springs 8,12 are clamped to the support member 10 and to the tube 5 using clamp bars 9,11,13,14 as mentioned above. These bars are made of brass and are used to distribute the stress of the fixing screws (not shown) more evenly across the width of the spring. The choice of material for these parts is determined by using a material that will not introduce fretting or galling corrosion between the materials.

A problem that can sometimes arise when using the flexure at high speed is that the leaf springs go into resonance, creating vibration at the lens which negatively impacts on image quality. The stiffening plates 30-33 reduce this problem when the voice coil is actuated at high speed. The bonding of the stiffening plates ensures that the whole assembly behaves as a single item rather than the constituent parts resonating separately at their own resonant frequencies. The use of a low mass material such as SRBF for the spring stiffener means that any resonance in the spring transmits less energy to the tube 5, reducing the tendency for the lens to tilt as the springs resonate. By ensuring that the part of the spring left unstiffened is as small as possible, the effects of spring resonance can be reduced to negligible levels.

The voice coil actuator is a standard "off the shelf" item, in this example manufactured by BEI Technologies, Inc. The end of the tube 5 is designed so that the voice coil actuator is directly in line with the lens 1. The tube structure is also carefully designed so that its centre of gravity, the centre of gravity of the lens and the voice coil actuator 20-24 are all in line, thus placing the centre of gravity of all the components directly on axis with the force from the voice coil actuator. An advantage of this arrangement is that it allows a standard, off the shelf voice coil actuator to be used to focus a comparatively large lens.

The voice coil mounting bracket 26 is sufficiently substantial to ensure that when the voice coil actuator is energised, the bracket only deflects by a negligible amount, thus ensuring that all the motion occurs in the flexure. The flexure arrangement ensures when energy is applied to the voice coil the leaf springs deflect in parallel. The arrangement of the flexure, and the lens and tube assembly having a centre of gravity in line with the actuating force, ensures that when the actuator operates the lens and tube move with the minimum amount of translation or rotation in the non-focussing axes of the lens. Typically, for a deflection of a few microns the de-centre and tilt will be less than a tenth of a micron, even at high speed.

The substantial bracket 26 described earlier is made from a close grained grey cast iron. This material is dense, allowing the mass to resist the load to be compact. However, close grain grey cast iron also damps out the vibration generated in moving the lens assembly. The bracket 26 also features the adjustment block 25 to mount the other half of the voice coil actuator. This allows adjustment to centre the two halves of the voice coil actuator to take up any tolerance build up in the flexure assembly.

In between the two leaf springs 8,12 the tube 5 is cut away front and back to form aligned apertures 40,41, so as to allow a fixed 45 degree mirror 42 to be placed behind the objective lens 1. This mirror 42 is fixed to the support member 10 via an arm 43 extending through the aperture 41. This allows the image to be diverted out at right angles to the lens axis.

Figure 3:
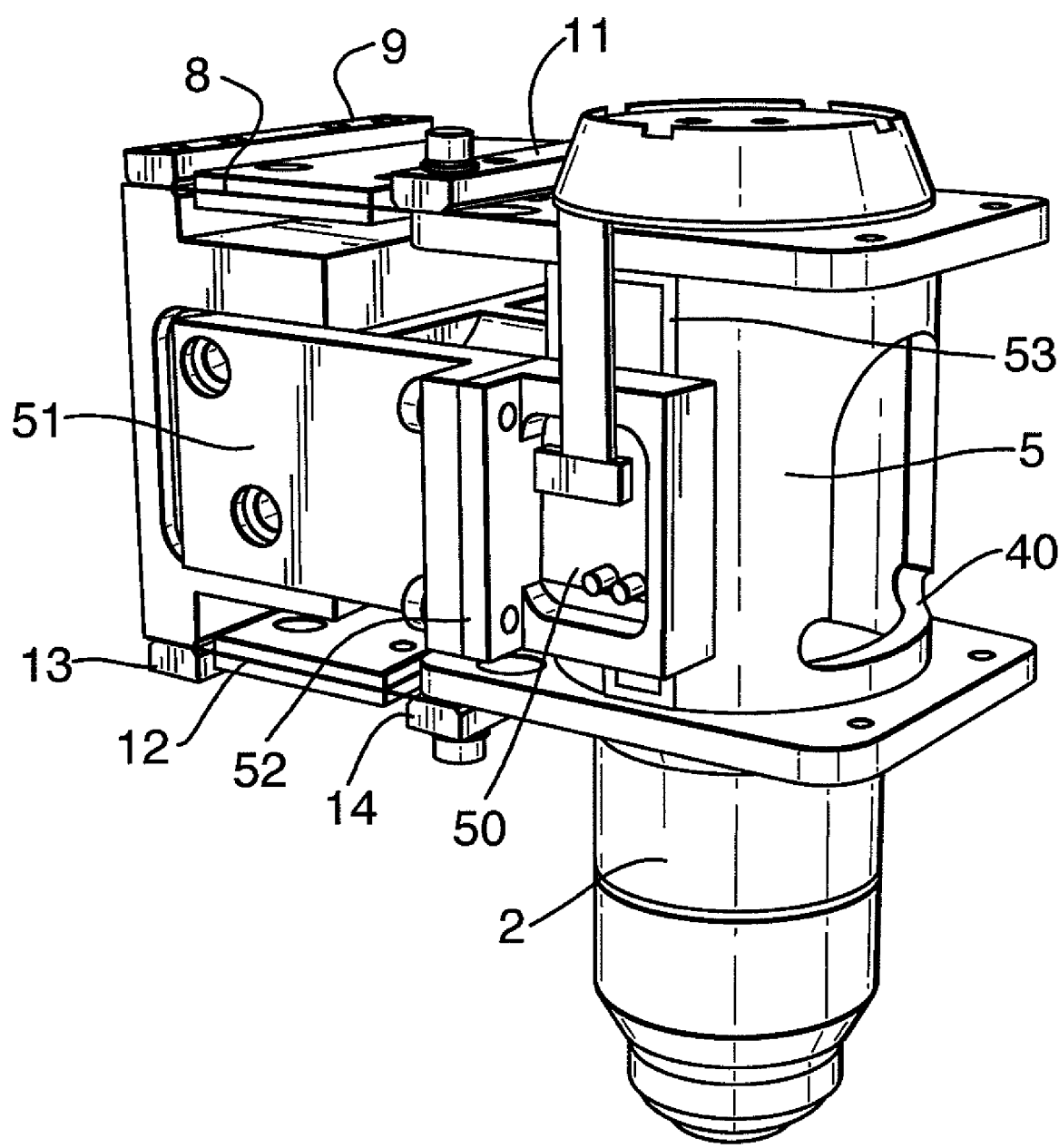
FIG. 3 is a perspective view of the objective lens positioning assembly from the opposite side to that of FIG. 1 and with the voice coil bracket removed; and, FIG. 4 is a cross-section through the objective lens positioning assembly.

In order to operate the focus mechanism in a closed control loop a linear encoder, such as the Renishaw system, may be fitted. In this arrangement (as shown in FIG. 3) a readhead 50 would be mounted from a bracket 51 attached to the flexure base. The encoder is mounted in a housing bolted to the bracket, to provide suitable alignment adjustment for the encoder. An encoder strip 53 is mounted on a flat portion on the outside of the tube 5.

The tube 5 may also be provided with fixing points (not shown) to allow small additional masses to be added. These masses can be used to trim the weight distribution of the tube and lens assembly, for example to correct for any imbalance caused in component manufacture.

We claim:

1. A lens positioning assembly comprising a lens mounting member to which a lens defining an optical axis is mounted, the lens mounting member being movably connected to a support member; an actuator on the optical axis of the lens for applying a force to the lens mounting assembly the force passing through the centre of mass of the lens; and a reflector mounted to the support member independently of the lens mounting member and located on the optical axis between the lens and the actuator for reflecting radiation passing through the objective lens away from the optical axis.

2. An assembly according to claim 1, wherein the lens mounting member comprises a tube to which the objective lens is mounted, the tube having an aperture in its sidewall through which radiation is reflected in use by the reflector.

3. An assembly according to claim 2, further comprising a second aperture in the sidewall of the tube located symmetrically with respect to the one aperture.

4. An assembly according to claim 3, wherein the reflector is mounted on an arm extending through the second aperture and fixed to said support member.

5. An assembly according to claim 1, further comprising a flexure connecting the lens mounting assembly to the support member to enable the lens mounting assembly to move relative to the support member.

6. An assembly according to claim 5, wherein the flexure comprises a pair of leaf springs, each leaf spring having first and second ends, the first ends of the leaf springs being secured to upper and lower aligned locations respectively on the support member, and the second ends of the leaf springs being secured to corresponding upper and lower locations respectively on the lens mounting member whereby the two leaf springs, the optical axis of the objective lens, and a line between the upper and lower aligned locations on the support member define a parallelogram, the leaf springs flexing in use in response to movement of the lens mounting member.

7. An assembly according to claim 6, further comprising stiffening members secured to each leaf spring to reduce the active length of the leaf springs.

8. An assembly according to claim 7, wherein the stiffening members comprise plates having a thickness greater than that of the leaf springs.

9. An assembly according to claim 8, wherein the stiffening members are bonded to the leaf springs across their whole surface area.

10. An assembly according to claim 7, wherein the stiffening members are made in synthetic resin bonded fabric laminate.

11. An assembly according to claim 6, wherein the leaf springs are made of metal.

12. An assembly according to claim 11, wherein the leaf springs are made in cold rolled stainless steel.

13. An assembly according to claim 1, wherein the actuator includes a linear actuator.

14. An assembly according to claim 13, wherein the actuator is one of a piezoelectric device and a voice coil actuator.

15. An assembly according to claim 14, wherein the linear actuator comprises a voice coil actuator formed by two interacting parts, one part mounted to the lens mounting member and the other part to a support member independent of the lens mounting member.

16. An assembly according to claim 15, wherein one of the interacting parts is a magnet and the other is an electrical coil.

17. An assembly according to claim 16, wherein the magnet is mounted to the support member and the coil is mounted to the lens mounting member.

18. An assembly according to claim 17, wherein the magnet and electrical coil define respective axes that are aligned with the optical axis of the objective lens.

19. An assembly according to claim 1, further comprising a movement monitoring system for monitoring movement of the lens mounting member relative to the support member.

20. An assembly according to claim 19, wherein the movement monitoring system comprises a linear encoder.

21. An assembly according to claim 1, wherein the lens is a microscope objective lens.

* * * * *